United States Patent
Paupert

(10) Patent No.: US 9,168,839 B2
(45) Date of Patent: Oct. 27, 2015

(54) ELECTRIC POWER DISTRIBUTION METHOD AND DEVICE

(71) Applicant: Schneider Electric Industries SAS, Rueil-Malmaison (FR)

(72) Inventor: Marc Paupert, St Jean de Vaulx (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 186 days.

(21) Appl. No.: 13/945,424

(22) Filed: Jul. 18, 2013

(65) Prior Publication Data

US 2014/0021917 A1 Jan. 23, 2014

(30) Foreign Application Priority Data

Jul. 20, 2012 (FR) ...................................... 12 57024

(51) Int. Cl.
*H02J 7/00* (2006.01)
*B60L 11/18* (2006.01)
*H02J 3/26* (2006.01)

(52) U.S. Cl.
CPC ......... *B60L 11/1816* (2013.01); *B60L 11/1818* (2013.01); *B60L 11/1825* (2013.01); *B60L 11/1842* (2013.01); *B60L 11/1844* (2013.01); *B60L 11/1846* (2013.01); *B60L 11/1862* (2013.01); *H02J 3/26* (2013.01);
(Continued)

(58) Field of Classification Search
CPC ........ H02J 5/005; H02J 7/025; B60L 2230/00
USPC .................. 320/107–109, 115, 126, 137–138
See application file for complete search history.

(56) References Cited

U.S. PATENT DOCUMENTS

| 8,890,475 B1 * | 11/2014 | Becker .......................... 320/109 |
| 2004/0169489 A1 * | 9/2004 | Hobbs .......................... 320/104 |
| 2006/0132085 A1 | 6/2006 | Loubeyre |

(Continued)

FOREIGN PATENT DOCUMENTS

| WO | WO 2010/091743 A2 | 8/2010 |
| WO | WO 2012/058421 A2 | 5/2012 |

OTHER PUBLICATIONS

French Preliminary Search Report issued Apr. 9, 2013, in French 1257024, filed Jul. 20, 2012 (with English Translation of Categories of Cited Documents).

*Primary Examiner* — Paul Dinh
(74) *Attorney, Agent, or Firm* — Oblon, McClelland, Maier & Neustadt, L.L.P.

(57) ABSTRACT

A method for distributing electricity is used in a system including a three-phase current distribution network, recharge terminals for electric vehicles connected to the distribution network via three phase conductors and one neutral conductor, electric vehicles equipped with a storage battery, means for measuring electric currents and voltages in the system, and a monitoring device for communicating with the electric vehicles and the measuring means. The distribution network supplies or receives electricity at the recharge terminals, and electric vehicles are recharged or discharged on these terminals via a single-phase or three-phase electric link. The method includes identifying an arrival of an electric vehicle at a recharge terminal, identifying energy requirements of the electric vehicle, assigning at least one electric current phase carried by one of the three phase conductors to the recharge terminal, and transferring energy to or from the storage battery (or batteries) of the electric vehicle.

10 Claims, 6 Drawing Sheets

Figure 1:
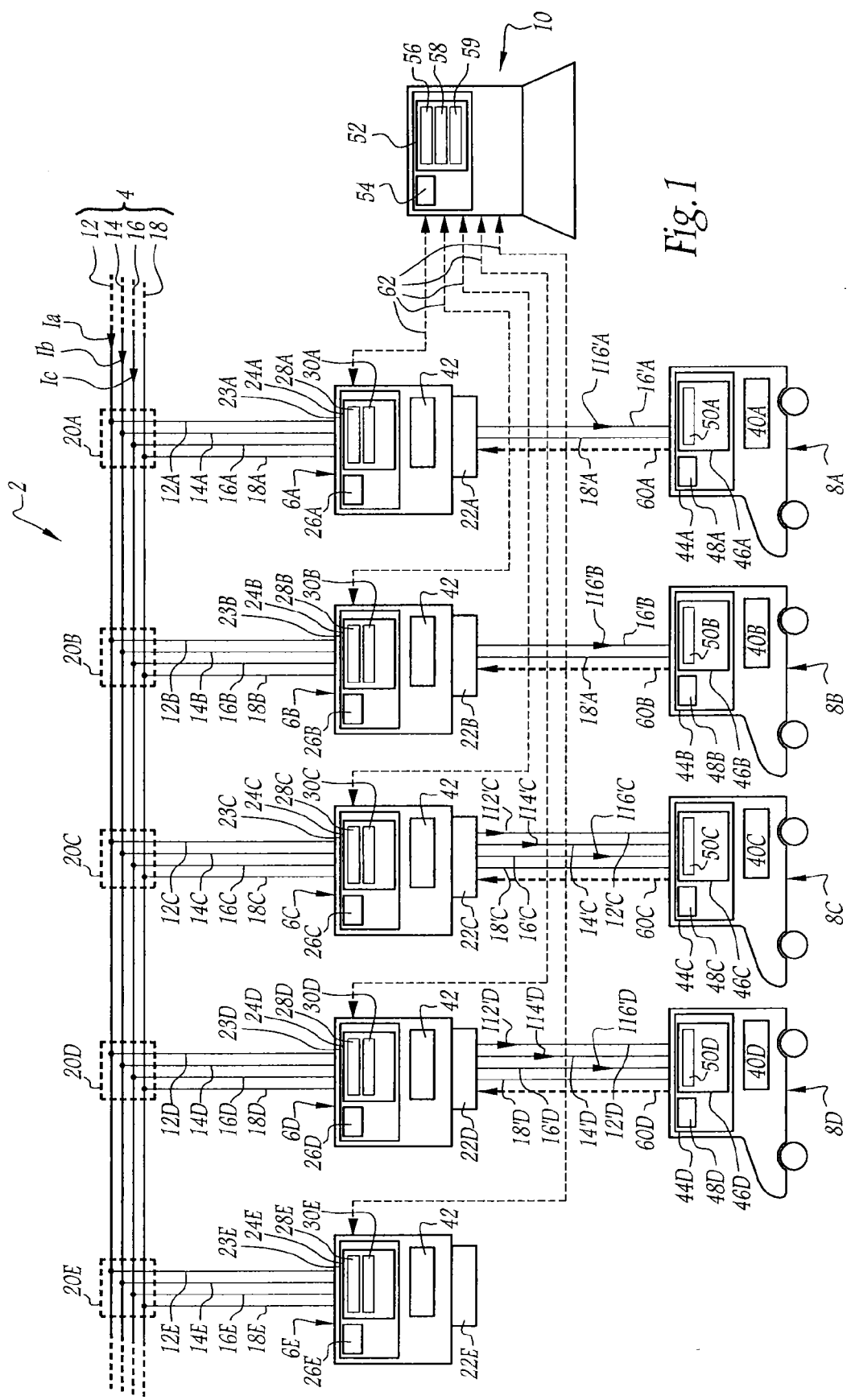

(52) U.S. Cl.
CPC .......... *H02J 7/0027* (2013.01); *B60L 2230/12* (2013.01); *B60L 2230/16* (2013.01); *B60L 2230/40* (2013.01); *B60L 2240/547* (2013.01); *B60L 2240/549* (2013.01); *B60L 2250/14* (2013.01); *B60L 2250/20* (2013.01); *Y02E 60/721* (2013.01); *Y02T 10/705* (2013.01); *Y02T 10/7005* (2013.01); *Y02T 10/7044* (2013.01); *Y02T 10/7055* (2013.01); *Y02T 10/7088* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(56) References Cited

U.S. PATENT DOCUMENTS

| | | |
|---|---|---|
| 2009/0189456 A1 | 7/2009 | Skutt |
| 2011/0055037 A1* | 3/2011 | Hayashigawa et al. ...... 705/26.1 |
| 2011/0202192 A1 | 8/2011 | Kempton |
| 2011/0202217 A1 | 8/2011 | Kempton |
| 2011/0202418 A1 | 8/2011 | Kempton et al. |
| 2012/0106672 A1 | 5/2012 | Shelton et al. |
| 2012/0109401 A1 | 5/2012 | Shelton et al. |
| 2012/0109402 A1 | 5/2012 | Shelton et al. |
| 2012/0109403 A1 | 5/2012 | Shelton et al. |
| 2012/0109797 A1 | 5/2012 | Shelton et al. |
| 2012/0109798 A1 | 5/2012 | Shelton et al. |
| 2012/0265459 A1* | 10/2012 | Sfaelos .......................... 702/61 |

\* cited by examiner

ELECTRIC POWER DISTRIBUTION METHOD AND DEVICE

The present invention relates a method for distributing electricity in a system comprising, inter alia, an electricity distribution network, electric vehicle recharge terminals and electric vehicles. The invention also relates to a device for distributing electricity intended to implement such a method.

In the field of electric vehicle recharge terminals, methods and devices for managing electricity distribution between the system comprising recharge terminals and electric vehicles connected to the terminals are known. Due to the mobility thereof, these vehicles are considered to be unpredictable loads. Furthermore, these vehicles may be very different in nature in terms of the number of phases used for recharging same, the charge and discharge capacity and communication with the recharge terminal. Developments are known, which are intended to anticipate that the same type of single-phase vehicle does not load the same phase of each terminal, for example by alternating the order of the arrangement of the phases from one terminal to another, so as to prevent overloading on one of the phases.

However, the type of electric vehicle may be different. The vehicle may be single-phase, i.e. have connections for coupling with the terminal requiring the drawing of electricity from one of the three phases of the terminal, whereby the phase may vary according to the make of vehicle. The vehicle may also be three-phase, i.e. have coupling connections requiring drawing from the three phases of the terminal. The benefit of the balancing mentioned above thus remains very limited since it cannot be adapted to the wide range of situations liable to be encountered.

The aim of the invention is thus that of providing a method for distributing electricity suitable for distributing the electric vehicle loads in a balanced manner on all the phases of the electric terminals to which the vehicles are connected.

For this purpose, the invention relates to a method for distributing electricity in a system comprising at least one three-phase current distribution network, recharge terminals for electric vehicles connected to the distribution network via three phase conductors and one neutral conductor, electric vehicles each equipped with at least one storage battery, means for measuring electric currents and voltages in the system and a monitoring device suitable for communicating with the electric vehicles and the measuring means, the distribution network being suitable for supplying or receiving electricity at the recharge terminals whereas the electric vehicles are suitable for being recharged or discharged on these terminals via a single-phase or three-phase electric link. This method comprises steps consisting of identifying an arrival of an electric vehicle at a terminal during a step a), identifying energy requirements of the electric vehicle during a step b), and transferring energy to or from the storage battery of the electric vehicle during a step d).

This method for distributing electricity is characterised in that it comprises at least one additional step c) after step b) and prior to step d), for assigning at least one electric current phase carried by one of the three phase conductors to the recharge terminal at which the electric vehicle arrives.

According to further advantageous aspects of the invention, the method for distributing electricity comprises one or a plurality of the following features, taken alone or in any technically feasible combination:

The additional step c) comprises at the least the following sub-steps: c1) determining the levels of use of each of the phases, c2) actuating a switch for assigning at least one phase to the recharge terminal.

If the electric vehicle arriving at a terminal is single-phase, the phase assigned for the recharging thereof is that least assigned to the vehicles already connected.

If the electric vehicle arriving at a terminal is three-phase, and if one of the phases is unable to accept additional loads, the loads assigned to the terminal phases are modified, to balance the loads on the three phases.

When modifying the loads assigned to the phases of the terminals, the load corresponding to a single-phase vehicle already connected to a terminal is switched to another phase.

When modifying the loads assigned to the phases of the terminals, the load is switched to the phase subject to the lowest load.

The method comprises a step consisting of setting, for each phase, current set-points for transferring electricity between the terminals and the electric vehicles.

The current set-points are such that they are suitable for optimally approximating the limits of the distribution contract.

The invention also relates to a device for distributing electricity comprising at least one three-phase current distribution network, recharge terminals for electric vehicles connected to the distribution network via three phase conductors and one neutral conductor, electric vehicles each equipped with at least one storage battery, means for measuring electric currents and voltages in the system and a monitoring device suitable for communicating with the electric vehicles and the measuring means, means for identifying an arrival of an electric vehicle at a recharge terminal, means for identifying energy requirements of the electric vehicle and means for transferring energy to or from the storage battery of the electric vehicle. The distribution network is suitable for supplying or receiving electricity at the recharge terminals whereas the electric vehicles are suitable for being recharged or discharged on these terminals via a single-phase or three-phase electric link. This device is characterised in that it comprises calculation means configured for implementing at least one step for assigning at least one electric current phase carried by one of the three phase conductors to the recharge terminal at which the electric vehicle arrives.

According to further advantageous aspects of the invention, the device for distributing electricity comprises the following feature:

The means for performing the step for assigning the phases for each of the recharge terminals are switching members embodied by electronic switches.

Figure 2:
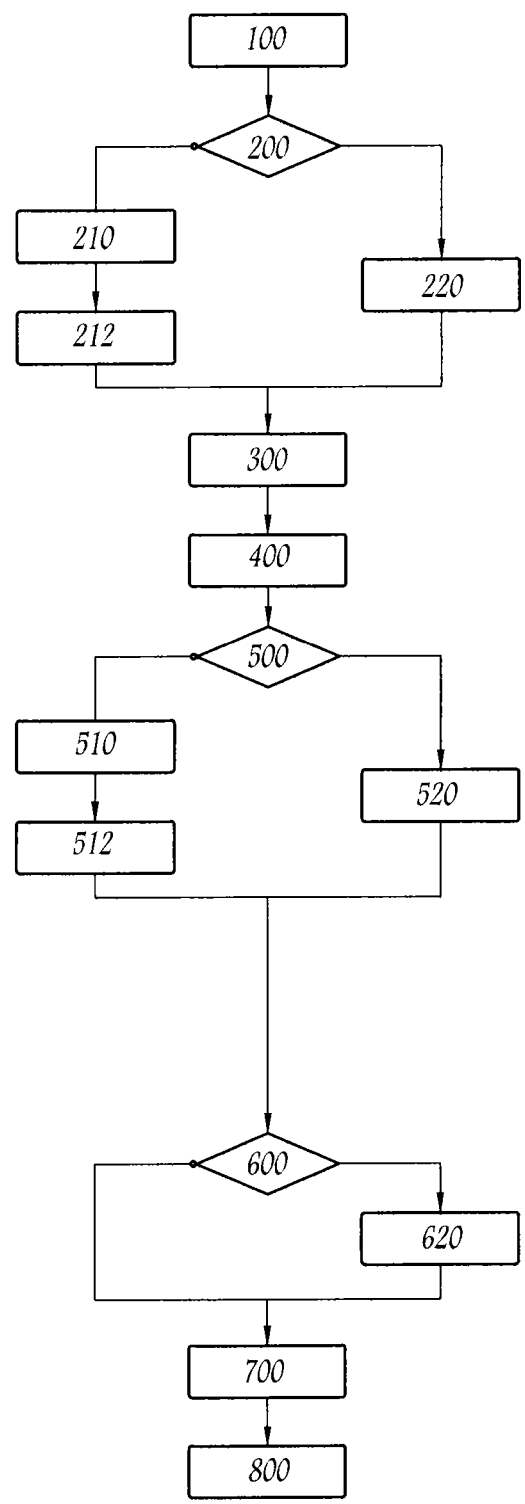
Figure 3:
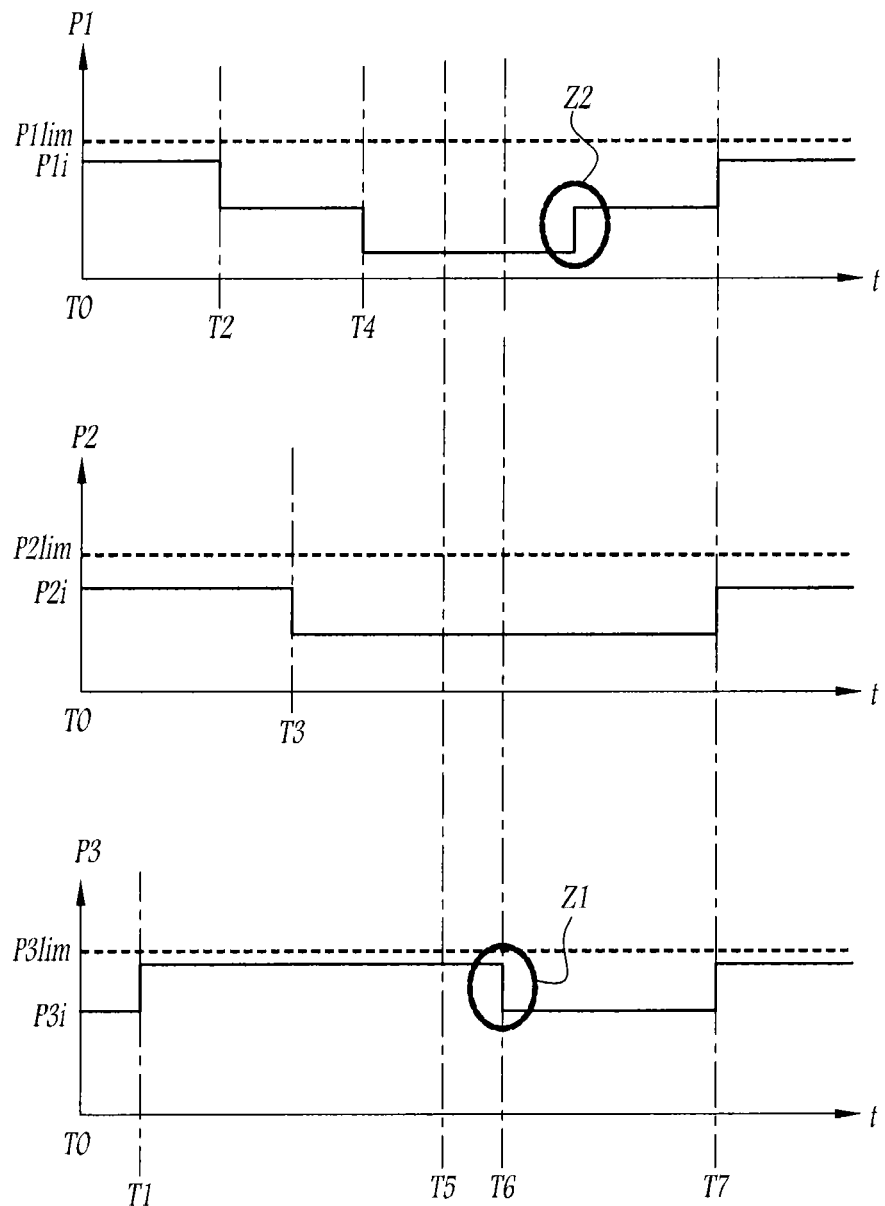
Figure 4:
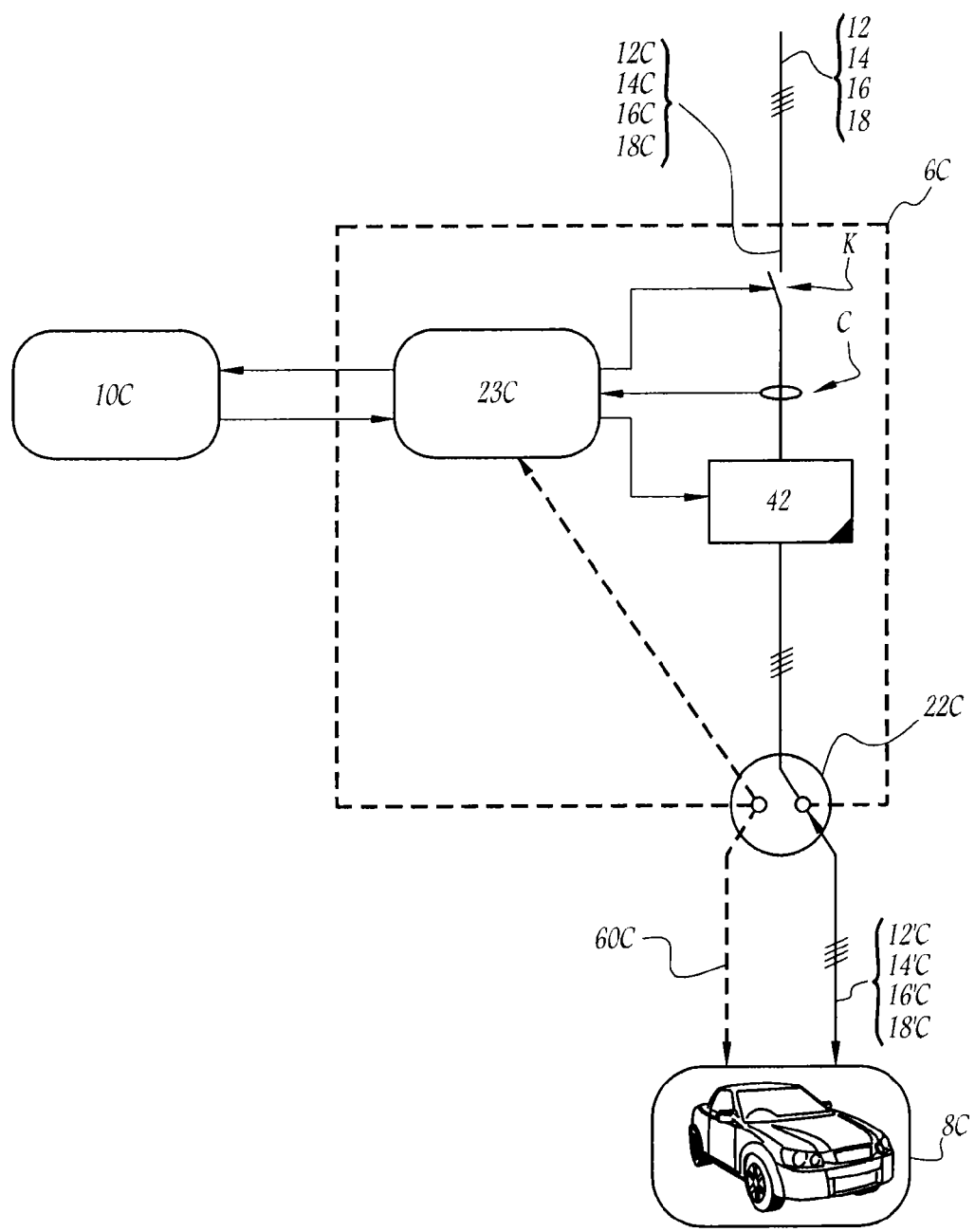
Figure 5:
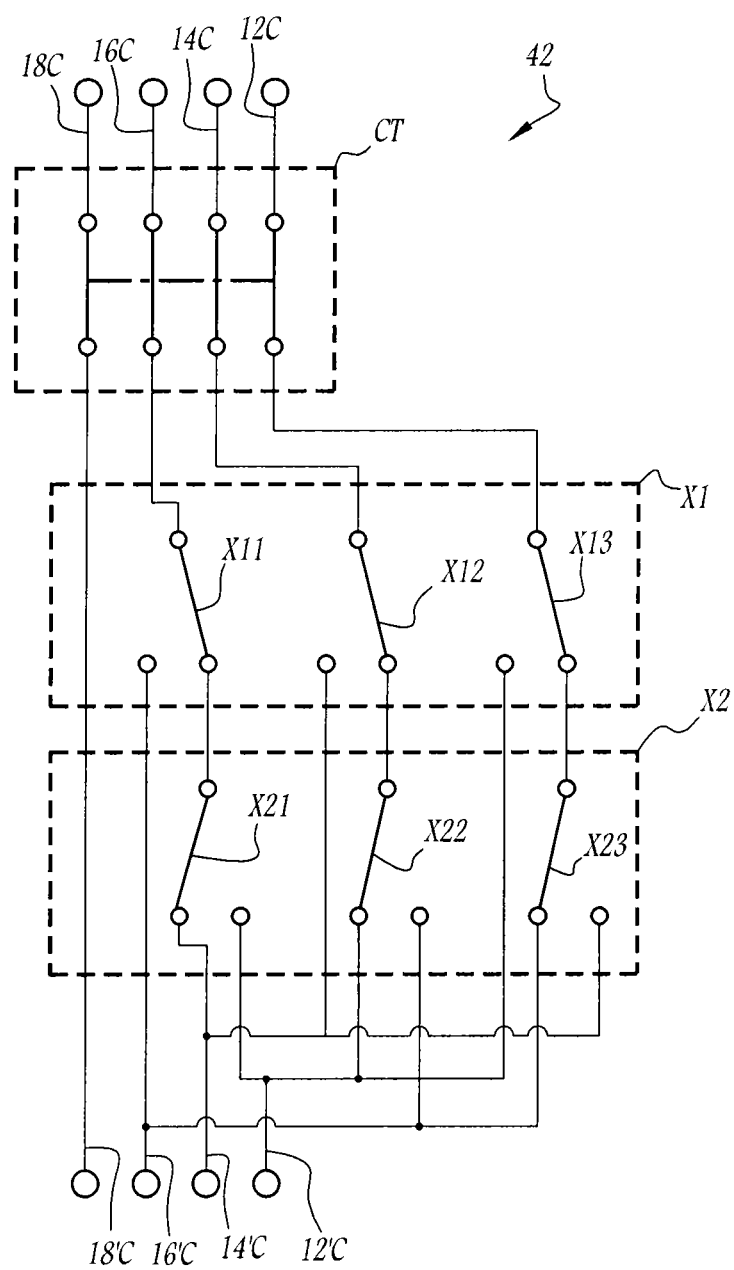
Figure 6:
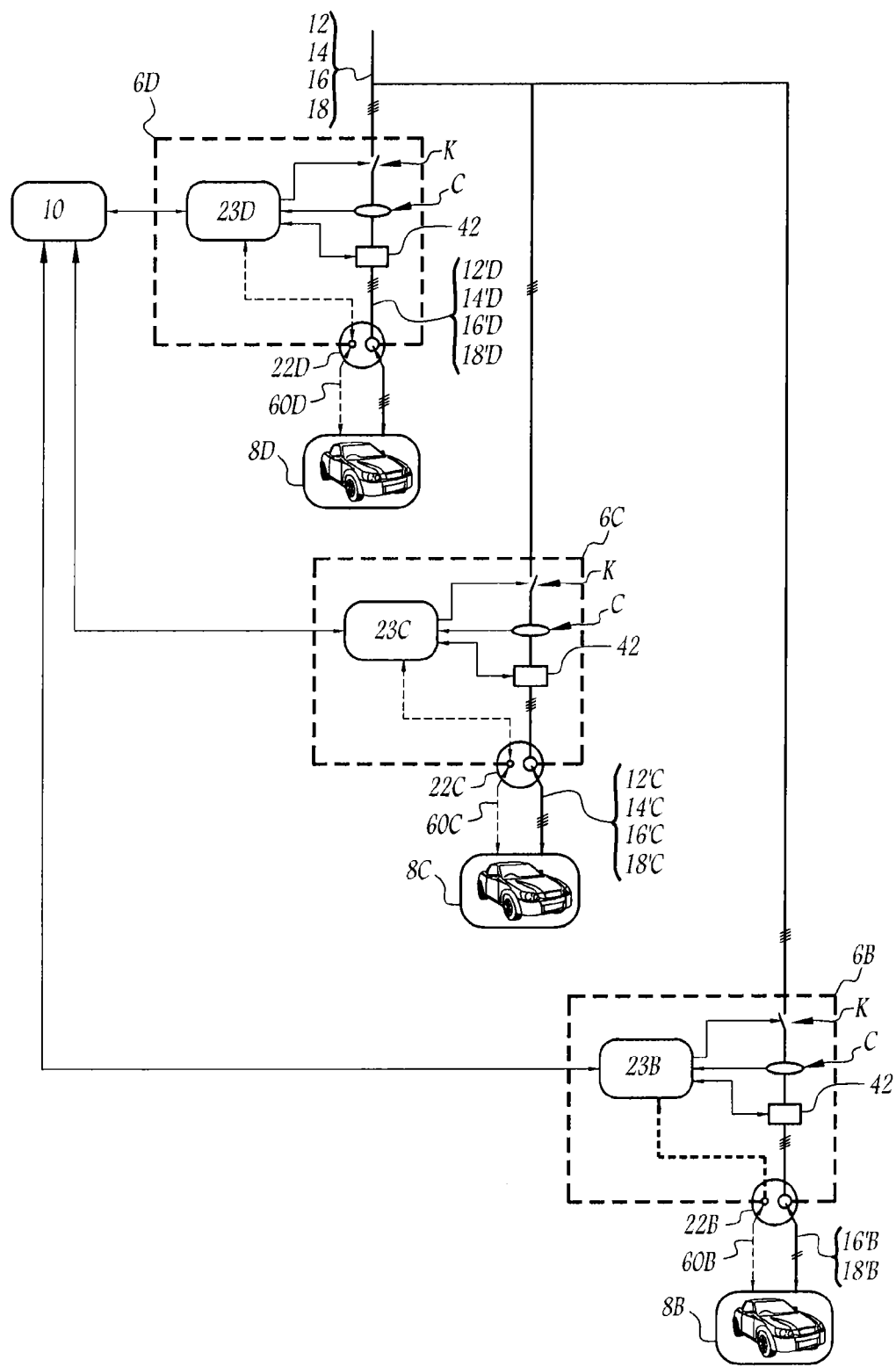

The features and advantages of the invention will emerge on reading the description hereinafter, given merely as a non-limiting example, with reference to the appended figures, wherein:

FIG. 1 is a schematic representation of a system comprising a device for distributing electricity according to the invention, FIG. 2 is a block diagram of a method for distributing electricity according to the invention implemented with the system in FIG. 1, FIG. 3 is a timing chart representing, for a given scenario, the progression over time of the power consumptions on each phase conductor while charging vehicles connected to the terminals, FIG. 4 is a schematic representation of a terminal communicating with a vehicle and a monitoring device shown in FIG. 1, FIG. 5 is an electric diagram of a switch shown in FIG. 4, and FIG. 6 is a schematic representation of three terminals communicating with a monitoring device, of which two terminals are connected to two three-phase vehicles whereas one terminal is connected to a single-phase vehicle.

In FIG. 1, a system 2 comprises an electric network 4, five recharge electric vehicle terminals 6A, 6B, 6C, 6D and 6E, four electric vehicles 8A, 8B, 8C and 8D connected to four terminals 6A and 6D and a monitoring device 10. In the embodiment represented in FIG. 1, the vehicles 8A and 8B connected to the terminals 6A and 6B are single-phase vehicles, i.e. the connection thereof to the terminals 6A and 6B is made by means of an electric link consisting of a phase conductor and a neutral conductor. Similarly, the vehicles 8C and 8D connected to the terminals 6C and 6D are three-phase vehicles, i.e. the connection thereof is made by means of an electric link consisting of three phase conductors and one neutral conductor. The terminal 6E is not connected by any electric vehicle; it is on standby for the connection of an additional vehicle.

The terminals 6A to 6E may be connected to any of the single-phase or three-phase vehicles 8A to 8D. In this way, the connection of a three-phase vehicle to any of the terminals 6A, 6B is made via three phase conductors of which only one can be seen in FIG. 1 and a neutral conductor shown in FIG. 1. Similarly, the connection of a single-phase vehicle to any of the terminals 6C, 6D is made via a single phase conductor of the three conductors shown in FIG. 1 and a neutral conductor also shown in FIG. 1.

The electric network 4 is a three-phase electricity distribution network comprising three first phase conductors 12, 14, 16 and one first neutral conductor 18.

Each terminal 6A to 6E is connected to the conductors 12, 14, 16, 18 via an output 20A, 20B, 20C, 20D or 20E. These outputs 20A to 20E each comprise three second phase conductors 12A, 14A, 16A, 12B, 14B, 16B, 12C, 14C, 16C, 12D, 14D, 16D, 12E, 14E, 16E and one second neutral conductor 18A, 18B, 18C, 18D, 18E, respectively. In this way, each of the terminals 6A to 6E is connected to the first conductors 12, 14, 16, 18 of the electric network 4 via the second conductors 12A to 18A, 12B to 18B, 12C to 18C, 12D to 18D, 12E to 18E of the outputs 20A to 20E.

As shown in FIG. 1, the terminals 6A to 6E comprise connectors 22A, 22B, 22C, 22D, 22E for connecting the terminals 6A to 6D to the electric vehicles 8A to 8D via third phase conductors 16'A, 16'B, 12'C, 14'C, 16'C, 12'D, 14'D, 16'D and neutral conductors 18'A, 18'B, 18'C, 18'D. In practice, the second 18A, 18B, 18C, 18D and third 18'A, 18'B, 18'C, 18'D neutral conductors are identical whereas the third phase conductors 16'A, 16'B, 12'C, 14'C, 16'C, 12'D, 14'D, 16'D are permutations of the second phase conductors 12A, 14A, 16A, 12B, 14B, 16B, 12C, 14C, 16C, 12D, 14D, 16D. For example, the third conductors 12'C, 14'C, 16'C are identical to the second conductors 12C, 16C, 14C, or to the second conductors 16C, 14C, 12C, respectively. As the vehicles 8A and 8B are single-phase vehicles, FIG. 1 shows a single-phase conductor 16'A, 16'B connecting the terminals 6A and 6B to the single-phase vehicles 8A and 8B.

Each terminal 6A to 6E also comprises a switch K and a current sensor C shown in FIG. 4 for the terminal 6C. The switches K enable the flow of electric current from the second phase conductors to the third phase conductors, whereas the current sensors C measure the intensity of the currents passing through each of the third phase conductors.

Each of the terminals 6A to 6E also comprises an information unit 23A, 23B, 23C, 23D, 23E comprising a memory 24A, 24B, 24C, 24D, 24E, a processor 26A, 26B, 26C, 26D, 26E associated with the memory 24A to 24E, and a first acquisition software 28A, 28B, 28C, 28D, 28E and a first communication software 30A, 30B, 30C, 30D, 30E.

Each of the terminals 6A to 6E also comprises a switching member 42, also referred to as a switch. This member 42 is suitable for setting the above-mentioned permutation of the second phase conductors 12A to 16D to obtain the configuration of the third phase conductors 16'A, 16'B, 12'C, 14'C, 16'C, 12'D, 14'D, 16'D. An example of a switching member 42 used in the terminal 6C is shown in FIG. 5 and comprises a contactor CT for allowing the flow of the current from the second contactors 12C to 18C to the third contactors 12'C to 18'C and two groups X1, X2 of switches. These two groups X1, X2 each comprise three switches X11, X12, X13 and X21, X22, X23 which, according to the position thereof, are suitable for setting the configuration of the three phase conductors as a permutation of the second phase conductors. In the example in FIG. 5, the configuration of the groups X1 and X2 of switches X11 to X23 performs the permutation for connecting the second conductors 12C, 14C, 16C to the third conductors 16'C, 12'C, 14'C, respectively.

The electric vehicles 8A to 8D are each provided with one or a plurality of storage batteries 40A, 40B, 40C, 40D. Each vehicle 8A to 8D also comprises a second information unit 44A, 44B, 44C, 44D comprising a memory 46A, 46B, 46C, 46D and a processor 48A, 48B, 48C, 48D associated with the memory. Each memory 46A to 46D comprises a second communication software 50A, 50B, 50C, 50D.

The monitoring device 10 comprises a memory 52 and a processor 54 associated with the memory 52. This memory 52 comprises a second data acquisition software 56, a third communication software 58, and a calculation software 59.

The distribution network 4 is suitable for supplying a three-phase electric current Ia, Ib, Ic to each of the terminals 6A to 6E, which are in turn suitable for supplying a current I16'A, 10 I16'B, I12'C, I14'C, I16'C, I12'D, I14'D, I16'D to the vehicles 8A to 8D so as to transfer energy with the storage battery/batteries 40A to 40D thereof. This energy is transferred from the terminals 6A to 6D for the vehicles 8A to 8D, in order to charge the storage batteries 40A to 40D. Alternatively, this energy may also be transferred from a storage battery 40A to 40D to a terminal 6A to 6D for at least one of the electric vehicles 8A to 8D.

The first information unit 23A to 23D is suitable for communicating via a first data link 60A, 60B, 60C, 60D, with the second information unit 44A to 44D using the first 30A to 30D and second 50A to 50D communication software. Establishing the link 60A to 60D enables the terminal 6A to 6D to acquire specific data for the vehicle 8A to 8D.

The first unit 23A to 23D is also suitable for communicating with the monitoring device 10 via a second data link 62. The type of data communicated is, for example, the measurement of the currents by the sensors C of the terminals 6A to 6D, or the data stream from the first links 60. These second links 62 are suitable for centralising data from the system 2 in the monitoring device 10, for controlling the switching member 42 of each terminal 6A to 6D, as a function of the current state of charge on each phase of the terminals.

The method for distributing electricity of the system 2 is explained using FIG. 2.

In a first step 100, an electric vehicle 8A to 8D is connected to one of the available terminals 6A to 6E of the system 2. During the connection of this electric vehicle 8A to 8D to the terminal 6A to 6D by a user, the latter communicates information to the monitoring device 10 conditioning the connection of the vehicle 8A to 8D to the terminal 6A to 6D via an interface not shown in the figures. This information is, for example, the sought connection time, or the sought autonomy for the vehicle batteries 40A to 40D.

During a second step 200, the communication software 30A to 30D of the terminal 6A to 6D tests whether the electric vehicle 8A to 8D is a communicating vehicle, i.e. a vehicle suitable for automatically communicating information to the first information units 23A to 23D of the terminal 6A to 6D relating, for example, to the number of phases used by the vehicle 8A to 8D to connect to the terminal 6A to 6D, the nominal charge current of the storage battery 40A to 40D of the vehicle 8A to 8D, the average consumption of the electric vehicle, the state of charge of the battery of the autonomy remaining in the vehicle. If the vehicle 8A to 8D connected to the terminal is a communicating vehicle, the above-mentioned data are automatically communicated, during a step 220, to the information unit 23A to 23D via the first link 60.

Otherwise, identification of the conductor(s) connected to the terminal 6A to 6D, along with identification of the nominal charge current of the storage batteries 40A to 40D is performed automatically during a step 210, the conditions of these identifications being consistent in duration with the non-triggering of the current surge protection devices. Then, during a step 212, the user communicates manually, in a similar manner to step 100, the above-mentioned further data.

During a step 300, the data retrieved during step 212 or 220 are sent to the monitoring device 10. In parallel with these data, the monitoring device 10 acquires further data specific to the system. These data are of three types. The first type of data relates to data associated with the consumption contract: power limit assigned to the electric vehicle fleet and available power for each phase for the incoming electric vehicle. The second type of data relates to direct, reverse and homopolar current values in the system 2, i.e. information on balancing the phases. Finally, a final type of data is information on the voltages at the outputs 20A to 20E of the terminals 6A to 6E, to monitor that they remain within the energy contract tolerances.

During a step 400, the monitoring device 10 calculates, according to the data acquired during steps and 300, the energy to be supplied to the battery 40A to 40D of each electric vehicle 8A to 8D connected to the system. This energy Wf is, for example, defined by the following equation [1]:

$$Wf = C(As - Ar) \quad [1]$$

where C is the average consumption in kilowatt-hours per kilometer, As the sought autonomy in kilometers and Ar the remaining autonomy in kilometers.

This energy Wf may also, for example, be defined by the following equation [2]:

$$Wf = Wt(SOCs - SOCr) \quad [2]$$

where Wt is the total energy capacity of the battery in kilowatt-hours, SOCs is the state of charge sought for the battery as a percentage, and SOCr is the remaining state of charge of the battery as a percentage.

Each of the two previous calculations of the energy Wf may be weighted with a vehicle-specific data item to account for battery ageing.

During a step 500, the communication software 30A to 30D of the terminal 6A to 6D tests whether the vehicle 8A to 8D connected to the terminal 6A to 6D is a single-phase vehicle.

If the vehicle 8A to 8D is three-phase, the step 510 reorganises the assignment of the phases to the various terminals 6A to 6D, to balance the loads on the various phases, by switching a single-phase vehicle from an overloaded phase to an underloaded phase. Following this step 510, a step 512 makes the effective connection of the three-phase vehicle to the terminal by closing the switches of the contactor CT of the terminal.

If the vehicle is single-phase, the phase proposed to recharge the battery 40A to 40D thereof is assigned dynamically. This means that the phase with the lowest load is assigned during a step 520.

A step 600 tests whether the vehicle 8A to 8D is an intelligent vehicle, i.e. suitable for communicating with the terminal 6A to 6D such that the terminal determines an optimum recharge current for each phase 16'A, 16'B, 12'C to 16'C, 12'D to 16'D. This optimum current I16'A, I16'B, I12'C to I16'C, I12'D to I16'D enables rapid recharging, while observing the balance of the network and the energy contract. In such a case, a step 620 consists of configuring the charge currents on the phase, for a single-phase vehicle, or the phases, for a three-phase vehicle. The set-point values may be, for example, the active and reactive current values to be supplied or consumed for each of the three phases. These set-points are suitable for rebalancing the network and thus optimise the use of the contract.

One step 700 consists of transferring energy between the terminal 6A to 6D and the electric vehicle 8A to 8D. This energy transfer may be charging when the aim of connecting the vehicle 8A to 8D to the terminal 6A to 6D is that of recharging these batteries 40A to 40D. If the vehicle is suitable for supplying energy, this energy transfer may consist of discharging at least a part of the battery 40A to 40D of the vehicle 8A to 8D.

Finally, a final step 800 consists of counting the amount of energy transferred between the terminal 6A to 6D and the electric vehicle 8A to 8D in kilowatt-hours to better manage the current energy contracts. This step may commence from the start of the step 700.

To illustrate the method in FIG. 2, the example of the arrival of a single-phase vehicle followed by a three-phase vehicle is described.

The three timing charts in FIG. 3 represent the electric powers P1, P2 and P3 transiting via the phase conductors 12, 14 et 16, also referred to as first L1, second L2 and third L3 phases, respectively, upstream from the terminals 6A to 6E. In this example and as seen in FIG. 3, the distribution contact power limits are represented by the dotted line at the limit power values P1*lim*, P2*lim* and P3*lim*. At the initial time T0, the powers P1*i*, P2*i*, P3*i* associated with the currents flowing through the phase conductors are as shown in the three timing charts and account for the loads connected to these three different phases. In this way, it is noted that the phase conductor 12 is subject to a higher load than the phase conductor 14, which is subject to a higher load than the phase conductor 16. At a time T1, a single-phase vehicle, for example the vehicle 8A, arrives at the available terminal 6A and the charging of the battery 40A is assigned to the conductor of the third phase. In this way, at the time T1, the addition of a load to the timing charge representing the progression of the power P3 is noted. At a time between the time T1 and a time T5, three successive drops in power are observed over the first two phases. These drops in power indicate an end of charge of a vehicle 8B to 8D or the departure of a vehicle on the first two phases L1 and L2. In this way, at the time T5, the first L1 and second L2 phases are suitable for receiving a further charge, while the power consumption on the third phase is close to the power limit P3*lim* of the distribution contract. At the time T5, a three-phase vehicle, for example the vehicle 8C, arrives at the terminal 6C for connection. It is detected by the terminal 6C which transmits the identification thereof to the monitoring device 10. Since the third phase L3 cannot accept a further load, the monitoring device 10 thus modifies, at a time T6 and using the switches 42, the assignment of the phases L1, L2, L3 on one of the vehicles connected to the third phase, in the example the vehicle 8A, by switching it to the phase subject to the lowest load, i.e. the first phase L1. In practice, the change of assignment of a single-phase vehicle from the third L3 to the first phase L2 can be seen in the zones Z1 and Z2 in FIG. 3 representing a drop in charge power on the third phase L3 before an increase in charge power on the first phase L1, respectively. The time lag shown in FIG. 3 may vary according to the device chosen to assign the phases. The time lag shown herein is merely intended to demonstrate that the rise in power shown in zone Z2 occurs after the drop in power shown in zone Z1. In practice, the phase assignment is changed quasi-instantaneously. In this way, the third phase L3 may again receive a further charge and the three-phase vehicle may be connected to the terminal to be recharged from a time T7.

Alternatively, the vehicle initially connected to the third phase L3 is switched to the second phase L2 if the phase in question is not overloaded, i.e. if accepting a further vehicle does not give rise on this phase of a power consumption higher than the limit set by the distribution contract.

Also alternatively, the arrival of a vehicle at a terminal may require a change of assignment of a plurality of phases to the other terminals of the system. This is particularly the case when the incoming vehicle is three-phase and two of the phases, for example the phases L1 and L2, have significant loads whereas the third phase L3 is underloaded.

In this way, when a new single-phase vehicle arrives, the phase assignment makes it possible to optimise the contact while preventing saturation of any of the phases. In practice, the switches 42 make it possible to receive additional vehicles.

The distribution system 2 according to the invention and the associated method thereof is thus suitable, when an electric vehicle 8A to 8D arrives to transfer energy at any of the terminals 6A to 6D of the system 2 to modify the assignment of the phases to one or a plurality of terminals to optimise the power consumptions on each phase and observe the power limits of the electricity distribution contract.

Moreover, the monitoring device 10, the electric vehicles 8A to 8D and the terminals 6A to 6D are suitable for identifying each electric vehicle, and the ability thereof to communicate automatically. In particular, if the vehicle is suitable for communicating data on the charges of the battery 40A to 40D thereof, the monitoring device 10 is suitable for optimising the charge of the battery by approximating the distribution contract power consumption limit values P1*lim*, P2*lim* and P3*lim* as closely as possible and enabling balances of the loads on the network 4.

The system 2 associated with the method is thus suitable for being adapted to single-phase or three-phase vehicles 8A to 8D, which are communicating or non-communicating for basic data, and optionally intelligent for communicating charge data in respect of the batteries 40A to 40D of electric vehicle 8A to 8D.

The system 2 is suitable for any type of three-phase vehicle, including those which are only connected to a terminal using three phase conductors, with no neutral conductor.

The system 2 is also suitable for any type of hybrid vehicle having a connector for transferring energy between the battery/batteries thereof and a recharge terminal.

In the embodiment described, the calculations and assignment of the phases L1, L2, L3 are performed completely automatically.

Various enhancements and alternative embodiments of the device and method described herein may also be envisaged. For example:
  the number of terminals is variable,
  the type of electric vehicle is variable. Each vehicle may have, inter alia, a single-phase or three-phase power supply, be optionally communicating, be optionally intelligent, be capable of charge or discharging the battery thereof,
  the measuring, calculating and control means may be located at different points than those represented in the appended figures;
  the switches may be of different types such as IGBT electronic switches for example.

The invention claimed is:

1. Method for distributing electricity comprising:
  (a) providing a system comprising:
    a three-phase current distribution network,
    a plurality of recharge terminals for a plurality of electric vehicles connected to the distribution network via three phase conductors and one neutral conductor, each of said plurality of electric vehicles being equipped with at least one storage battery that is configured to be recharged by one of the recharge terminals, and
    circuitry configured to
      measure electric currents and electric voltages in the system, and
      communicate with the electric vehicles,
    the distribution network being configured to supply or receive electricity at the recharge terminals, the electric vehicles being adapted to be recharged or discharged on these terminals via a single-phase or three-phase electric link,
  (b) identifying an arrival of one of the electric vehicles at one of the recharge terminals;
  (c) identifying energy requirements of the one of the electric vehicles;
  (d) assigning at least one electric current phase carried by one of the three phase conductors to said one of the recharge terminals; and
  (e) transferring energy to or from the storage battery of said one of the electric vehicles.

2. Method according to claim 1, wherein step (d) comprises at least the following sub-steps:
  determining levels of use of each of the phases,
  actuating a switch for assigning at least one phase to the recharge terminal.

3. Method according to claim 1, wherein, if said one of the electric vehicles is single-phase, the phase assigned for the recharging thereof is that least assigned to the vehicles already connected to the other terminals.

4. Method according to claim 1, wherein, if said one of the electric vehicles is three-phase and if one of the phases is unable to accept additional loads, the loads assigned to the phases of the terminals are modified, to balance the loads on the three phases.

5. Method according to claim 4, wherein, when modifying the loads assigned to the phases of the terminals, the load corresponding to a single-phase vehicle already connected to a terminal is switched to another phase.

6. Method according to claim 5, wherein each of the phases provides a load ranging from a lowest load to a highest load, and wherein, when modifying the loads assigned to the phases of the terminals, the load is switched to the phase subject to the a lowest load.

7. Method according to claim 1, further comprising a step consisting of setting for each phase conductor current setpoints for transferring electricity between the terminals and the electric vehicles.

8. Method according to claim 7, wherein the current setpoints optimally approximate limits of a distribution contract.

9. Device for distributing electricity comprising:
a three-phase current distribution network,
a plurality of recharge terminals for a plurality of electric vehicles connected to the distribution network via three phase conductors and one neutral conductor, each of said plurality of electric vehicles being equipped with at least one storage battery that is configured to be recharged by one of the recharge terminals, and
circuitry configured to
measure electric currents and voltages in the system,
communicate with the electric vehicles,
identify an arrival of one of the electric vehicles at one of the recharge terminals,
identify energy requirements of said one of the electric vehicles,
assign to said one of the recharge terminals at least one electric current phase carried by one of the three phase conductors; and
transfer energy to or from the storage battery of said one of the electric vehicles,
the distribution network being configured to supply or receive electricity at the recharge terminals and the electric vehicles being adapted to be recharged or discharged on these terminals via a single-phase or three-phase electric link.

10. Device according to claim 9, wherein the circuitry comprises switching members embodied by electronic switches.

* * * * *